United States Patent
Tillman et al.

(10) Patent No.: US 9,012,597 B2
(45) Date of Patent: Apr. 21, 2015

(54) METHOD OF PRODUCING MACROCYCLIC POLYMERS

(75) Inventors: Eric S. Tillman, Lewisburg, PA (US); Andrew F. Voter, Fairport, NY (US)

(73) Assignee: Bucknell University, Lewisburg, PA (US)

( * ) Notice: Subject to any disclaimer, the term of this patent is extended or adjusted under 35 U.S.C. 154(b) by 111 days.

(21) Appl. No.: 13/696,142

(22) PCT Filed: May 5, 2011

(86) PCT No.: PCT/US2011/035353
§ 371 (c)(1),
(2), (4) Date: Jan. 23, 2013

(87) PCT Pub. No.: WO2011/140336
PCT Pub. Date: Nov. 10, 2011

(65) Prior Publication Data
US 2013/0131275 A1    May 23, 2013

Related U.S. Application Data

(60) Provisional application No. 61/331,565, filed on May 5, 2010.

(51) Int. Cl.
*C08F 293/00* (2006.01)
*C08F 8/00* (2006.01)
*C08F 8/48* (2006.01)

(52) U.S. Cl.
CPC ............. *C08F 293/00* (2013.01); *C08F 8/48* (2013.01); *C08F 2438/01* (2013.01)

(58) Field of Classification Search
CPC .................................................. C08F 293/00

USPC .................................................. 528/392, 397
See application file for complete search history.

(56) References Cited

PUBLICATIONS

Laurent, B. A. et al., "An Efficient Route to Well-Defined Macrocyclic Polymers via "Click" Cycliziation", J. Am Chem. Soc., vol. 128, No. 14, May 14, 2006, pp. 4238-4239.
Whittaker, M.R., et al., "Synthesis of Monocyclic and Linear Polystyrene Using the Reversible Coupling/Cleavage of Thiol/Disulfide Groups", Macromolecules, vol. 39, No. 26, Dec. 8, 2008, pp. 9028-9034.
Tsarevsky, Nicolay V. et al., "Reversible Redox Cleavage/Coupling of Polystyrene with Disulfide or Thiol Groups Prepared by Atom Transfer Radical Polymerization", Macromolecules, vol. 35, Oct. 22, 2002, pp. 9009-9014.
Laurent, Boyd A., et al., "Synthetic approaches for the preparation of cyclic polymers", Chem. Soc. Rev., vol. 38, Apr. 17, 2009, pp. 2202-2213.
Nicolay, R., "Synthesis of Multisegmented Degradable of Polymers by Atom Transfer Radical Cross-Coupling", Macromolecules, vol. 40, No. 26, Nov. 28, 2007, pp. 9217-9223.
International Search Report, dated Jul. 29, 2011, issued in priority International Application No. PCT/US2011/035353 and Written Opinion.

*Primary Examiner* — Duc Truong
(74) *Attorney, Agent, or Firm* — Saul Ewing LLP; Stephen J. Driscoll (57) ABSTRACT

A method for producing a macrocyclic polymer comprising: (a) polymerizing a monomer using a dibrominated initiator having either an aromatic or ester moiety via atom transfer radical polymerization (ATRP) to form a polymer precursor having brominated, phenylated end groups; and (b) cyclizing the polymer precursor using intramolecular atom transfer radical coupling (ATRC) to form the macrocyclic polymer.

21 Claims, 8 Drawing Sheets

METHOD OF PRODUCING MACROCYCLIC POLYMERS

REFERENCE TO RELATED APPLICATION

This application claims the priority of PCT/US2011/035353, filed on May 5, 2011, which is based on and claims priority to U.S. Provisional Application No. 61/331,565, filed May 5, 2010, incorporated herein by reference in its entirety, including its appendix.

FIELD OF INVENTION

The present invention relates generally to a method for producing macrocyclic polymers, and, more specifically, to a method of producing macrocyclic vinyl polymers via intramolecular radical-radical coupling of chain ends

BACKGROUND

Macrocyclic vinyl polymers have long elicited intense interest due to their unique properties when compared to linear polymer analogs. For example, beyond differences such as increased glass transition temperature and reduced viscosity, cyclic vinyl polymers show improved energy transfer between pendant groups compared to linear analogs, owing to their spatial orientation around the ring (especially pronounced at lower degrees of polymerization), making them potentially valuable in light harvesting systems.

Although macrocyclic vinyl polymers are desirable, a straightforward and efficient route to their synthesis has remained elusive. Specifically, while the direct synthesis of macrocyclic polymers has been accomplished by polyhomologation and ring opening metathesis polymerization (ROMP) using a cyclic derivative of Grubbs' catalyst, traditional methods for the synthesis of macrocyclic vinyl polymers tend to rely on the production of a linear precursor and subsequent end-to-end coupling. For example, $\alpha,\omega$-dilithiopolystyrene (LiPSLi) or $\alpha,\omega$-dipotassiopolystyrene (KPSK) are first produced and subsequently employed in two consecutive $S_N2$ reactions with a bifunctional electrophile, the second being intramolecular when performed under high dilution (~$10^{-4}$ M). Such reactions are exceedingly difficult to perform due to the high reactivity of polymer anions. This difficulty is compounded by a cyclization reaction that requires simultaneous dilute addition of both the polymer dianion and bifunctional electrophile into a reaction mixture.

The development of controlled radical polymerization methods, especially atom transfer radical polymerization (ATRP) and nitroxide mediated polymerization (NMP), has opened the door to experimentally more lenient syntheses of well-defined telechelic linear precursors. Nevertheless, a major drawback of linear precursors is the requirement of compatibly reactive $\alpha,\omega$ end groups, which must be installed post-polymerization. For example, intramolecular click chemistry and intramolecular ring closing metathesis has proven highly efficient in producing macrocycles, but relies on synthetic modification of polymer chains prior to employing them in cyclization reactions. This approach may create multiple problems, including, for example, the need to quantitatively modify the polymer to produce high yields of cyclic products, additional functionalization of the cyclic products as a consequence of these modifications, which may or may not be desirable. Additionally, modification of the polymer chain ends prior to coupling adds step(s) to the overall synthetic route to produce macrocycles.

Therefore, there is a need for a method of producing macrocyclic polymers that avoids the need for post-polymerization fuctionalization of the precursor to form reactive $\alpha,\omega$ end groups to facilitate cyclization of the molecule. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention involves a method for producing macrocyclic polymers that avoids post-polymerization fuctionalization by relying instead on consecutive atom transfer reactions: (I) atom transfer radical polymerization (ATRP) and (II) intramolecular atom transfer radical coupling (ATRC). Accordingly, in one embodiment, the method of producing a macrocyclic polymer comprises: (I) polymerizing a monomer using a dibrominated compound having either an aromatic or ether moiety via ATRP to form a polymer precursor having brominated, phenylated end groups; and (II) cyclizing the polymer precursor using intramolecular ATRC to form the macrocyclic polymer.

In an alternative embodiment, Step I involves an ATRP polymerization in which an intermediate polymer is formed that lacks the phenylated end groups necessary for ATRC. Such an embodiment requires an additional step in which the intermediate polymer is block copolymerized using ATRP to add terminal block polymers having phenylated end groups to the intermediate polymer to form the polymer precursor with brominated, phenylated end groups. In this alternative embodiment, the intermediate polymer is prepared independently of the ATRC reaction, and thus does not require brominated, phenylated end groups. Accordingly, the intermediate polymer can be produced based on the desired polymer properties without being limited by end group requirements. The necessary end groups to facilitate ATRC are added subsequently.

BRIEF DESCRIPTION OF FIGURES

polystyrene block copolymer to form macrocyclic poly(methyl methacrylate) polystyrene block copolymer.

DETAILED DESCRIPTION

Definitions

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "alkyl" as used herein refers to a branched or unbranched saturated hydrocarbon group typically although not necessarily containing 1 to about 20 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 18 carbon atoms, preferably 1 to about 12 carbon atoms. The term "lower alkyl" intends an alkyl group of 1 to 6 carbon atoms. "Substituted alkyl" refers to alkyl substituted with one or more substituent groups, and the terms "heteroatom-containing alkyl" and "heteroalkyl" refer to an alkyl substituent in which at least one carbon atom is replaced with a heteroatom, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "alkylene" as used herein refers to a difunctional linear, branched, or cyclic alkyl group, where "alkyl" is as defined above.

The term "alkenyl" as used herein refers to a linear, branched or cyclic hydrocarbon group of 2 to about 20 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein contain 2 to about 18 carbon atoms, preferably 2 to 12 carbon atoms. The term "lower alkenyl" intends an alkenyl group of 2 to 6 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to 20 carbon atoms containing at least one triple bond, such as ethynyl, n-propynyl, and the like. Generally, although again not necessarily, alkynyl groups herein contain 2 to about 18 carbon atoms, preferably 2 to 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms, and includes, for example, methoxy, ethoxy, n-propoxy, isopropoxy, t-butyloxy, etc. Preferred substituents identified as "C1-C6 alkoxy" or "lower alkoxy" herein contain 1 to 3 carbon atoms, and particularly preferred such substituents contain 1 or 2 carbon atoms (i.e., methoxy and ethoxy).

The term "aryl" as used herein, and unless otherwise specified, refers to an aromatic substituent generally containing 5 to 30 carbon atoms and containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "aralkyl" refers to an alkyl group with an aryl substituent, and the term "alkaryl" refers to an aryl group with an alkyl substituent, wherein "alkyl" and "aryl" are as defined above. In general, aralkyl and alkaryl groups herein contain 6 to 24 carbon atoms, while preferred aralkyl and alkaryl groups contain 6 to 16 carbon atoms, and particularly preferred such groups contain 6 to 12 carbon atoms. Examples of aralkyl groups include, without limitation, benzyl, 2-phenylethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-dienyl, and the like.

The term "acryloyl" refers to a functional group with structure H2C=CH—C(=O)—; it is the acyl group derived from acrylic acid. The preferred IUPAC name for the group is prop-2-enoyl, and it is also (less correctly) known as acrylyl or simply acryl. Compounds containing an acryloyl group can be referred to as "acrylic compounds".

The term "Acrylate" refers to a function group with structure ($CH_2$=CHCOO$^-$) and includes the ion of acrylic acid and methacrylate the ion of methacrylic acid.

The terms "halo," "halide," and "halogen" are used in the conventional sense to refer to a chloro, bromo, fluoro, or iodo substituent. The terms "haloalkyl," "haloalkenyl," and "haloalkynyl" (or "halogenated alkyl," "halogenated alkenyl," and "halogenated alkynyl") refer to an alkyl, alkenyl, or alkynyl group, respectively, in which at least one of the hydrogen atoms in the group has been replaced with a halogen atom.

The term "cyclic" refers to alicyclic or aromatic substituents that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "heteroatom-containing" as in a "heteroatom-containing alkyl group" (also termed a "heteroalkyl" group) or a "heteroatom-containing aryl group" (also termed a "heteroaryl" group) refers to a molecule, linkage or substituent in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

Unless otherwise indicated, the term "hydrocarbyl" is to be interpreted as including substituted and/or heteroatom-containing hydrocarbyl moieties. "Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 3 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: halo, hydroxyl, sulfhydryl, C1-C20 alkoxy, C2-C20 alkenyloxy, C2-C20 alkynyloxy, C5-C24 aryloxy, acyl (including C2-C20 alkylcarbonyl (—CO-alkyl) and C6-C24 arylcarbonyl (—CO-aryl)), acyloxy (—O-acyl), C2-C20 alkoxycarbonyl (—(CO)—O-alkyl), C6-C24 aryloxycarbonyl (—(CO)—O-aryl), halocarbonyl (—CO)—X where X is halo), C2-C20 alkylcarbonato (—O—(CO)—O-alkyl), C6-C24 arylcarbonato (—O—(CO)—O-aryl), carboxy (—COOH), carboxylato (—COO—), carbamoyl (—(CO)—NH2), mono-substituted C1-C24 alkylcarbamoyl (—(CO)—NH(C1-C20 alkyl)), di-substituted alkylcarbamoyl (—(CO)—N(C1-C20 alkyl)2), mono-substituted arylcarbamoyl (—(CO)—NH-aryl), thiocarbamoyl (—(CS)—NH2), carbamido (—NH—(CO)—NH$_2$), cyano (—C≡N), isocyano (—N+≡C—), cyanato (—O—C≡N), isocyanato (—O—N+≡C—), isothiocyanato (—S—C≡N), azido (—N=N+=N—), formyl (—(CO)—H), thioformyl (—(CS)—H), amino (—NH2), mono- and di-(C1-C20 alkyl)-substituted amino, mono- and di-(C5-C24 aryl)-substituted amino, C2-C20 alkylamido (—NH—(CO)-alkyl), C5-C24 arylamido (—NH—(CO)-aryl), imino (—CR=NH where R=hydrogen, C1-C20 alkyl, C5-C24 aryl, C6-C24 alkaryl, C6-C24 aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO2), nitroso (—NO), sulfo (—SO2-OH), sulfonato (—SO2-O31), C1-C20 alkylsulfanyl (—S-alkyl; also termed "alkylthio"), arylsulfanyl (—S-aryl; also termed "arylthio"), C1-C20 alkylsulfinyl (—(SO)-alkyl), C5-C24 arylsulfinyl (—(SO)-aryl), C1-C20 alkylsulfonyl (—SO2-alkyl), C5-C24 arylsulfonyl (—SO2-aryl), phosphono (—P(O)(OH)2), phosphonato (—P(O)(O—)2), phosphinato (—P(O)(O—)), phospho (—PO2), and phosphino (—PH2); and the hydrocarbyl moieties C1-C20 alkyl (preferably C1-C18 alkyl, more preferably C1-C12 alkyl, most preferably C1-C6 alkyl), C2-C20 alkenyl (preferably C2-C18 alkenyl, more preferably C2-C12 alkenyl, most preferably C2-C6 alkenyl), C2-C20 alkynyl (preferably C2-C18 alkynyl, more preferably C2-C12 alkynyl, most preferably C2-C6 alkynyl), C5-C24 aryl (preferably C5-C14 aryl), and C6-C24 aralkyl (preferably C6-C16 aralkyl). In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

The term "polymer" includes homopolymers as well as copolymers, terpolymers, and the like, and copolymers herein include block copolymers, alternating copolymers, and random copolymers.

When the term "substituted" appears prior to a list of possible substituted groups, it is intended that the term apply to every member of that group. For example, the phrase "substituted alkyl and aryl" is to be interpreted as "substituted alkyl and substituted aryl."

In the molecular structures herein, the use of bold and dashed lines to denote particular conformation of groups follows the IUPAC convention. A bond indicated by a broken line indicates that the group in question is below the general plane of the molecule as drawn (the "α" configuration), and a bond indicated by a bold line indicates that the group at the position in question is above the general plane of the molecule as drawn (the "β" configuration.

Embodiments

Figure 1:
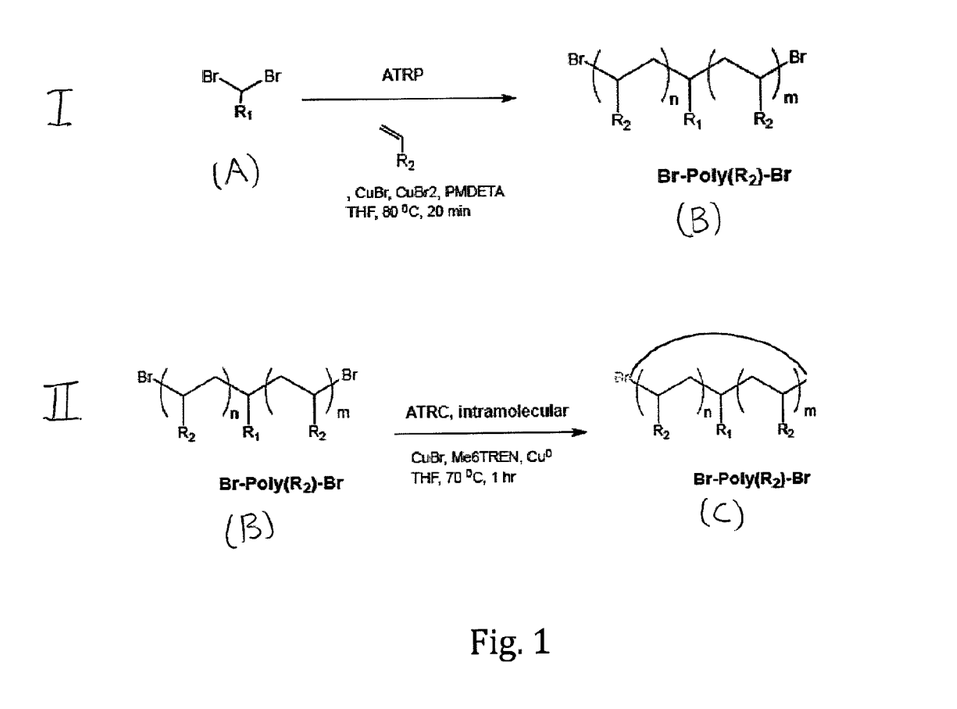
FIG. 1 illustrates a generic mechanism for (I) ATRP of a monomer using a bifunctional initiator to generate dibrominated polymer precursor, and (II) ATRC of the dibrominated polymer to form macrocyclic polymer.

Referring to FIG. 1, one embodiment of the method for the producing macrocyclic polymers of the present invention is shown. The method comprises (I) polymerizing a monomer using a dibrominated initiator (A) having either an aromatic or ester moiety via atom transfer radical polymerization (ATRP) to form a polymer precursor (B) having brominated, phenylated end groups; and (II) cyclizing the polymer precursor using intramolecular atom transfer radical coupling (ATRC) to form the macrocyclic polymer (C).

Considering step I in greater detail, the initiator has the following structure:

(A)

wherein R1 is an aryl group or an ester group so as to stabilize the initiator as is known in the art. In one embodiment, R1 is an aryl group selected from phenyl, napthyl, flourenyl, anthracenyl. In one embodiment, the aryl group is phenyl. In a particularly preferred embodiment, the initiator is benzal bromide.

In one embodiment, R1 is the ester group, having the following formula: $RCO_2R'$, wherein R and R' are selected independently form alkyl, alkylene, alkenyl, alkenylene, alkynyl, alkoxy, aryl, aralkyl, and hydrocarbyl. In one embodiment, R and R' are selected independently from methyl, ethyl, propryl, and butyl. In a more particular embodiment, the initiator is ethylene bis(2-bromoisobutyrate).

In one embodiment, the precursor polymer (B) has the following structure:

(B)

wherein: m is an integer from 1-100; n is an integer from 1-100; and R2 is an aryl. In a more particular embodiment, R2 is phenyl such that the end groups are brominated and phenylated. As used herein, a brominated, phenylated end group refers to a terminal carbon of the polymer to which a bromine atom and a phenyl group are bonded. Such end group functionality is required for the ATRC reaction of step II to from the macrocyclic polymer (C).

In another embodiment, R2 is not limited to an aryl. In such an embodiment, step (I) involves an intermediate step in which an intermediate polymer is formed first having desirable functionality, but lacking brominated, phenylated end groups. More specifically, referring to FIG. 1a, an alternative mechanism is shown having the intermediate Step Ia in which the monomer is polymerized to form an intermediate polymer (B') with brominated end groups; and Step Ib in which the intermediate polymer is block copolymerized using ATRP to add terminal block polymers having phenylated end groups to form the polymer precursor (B").

Figure 1A:
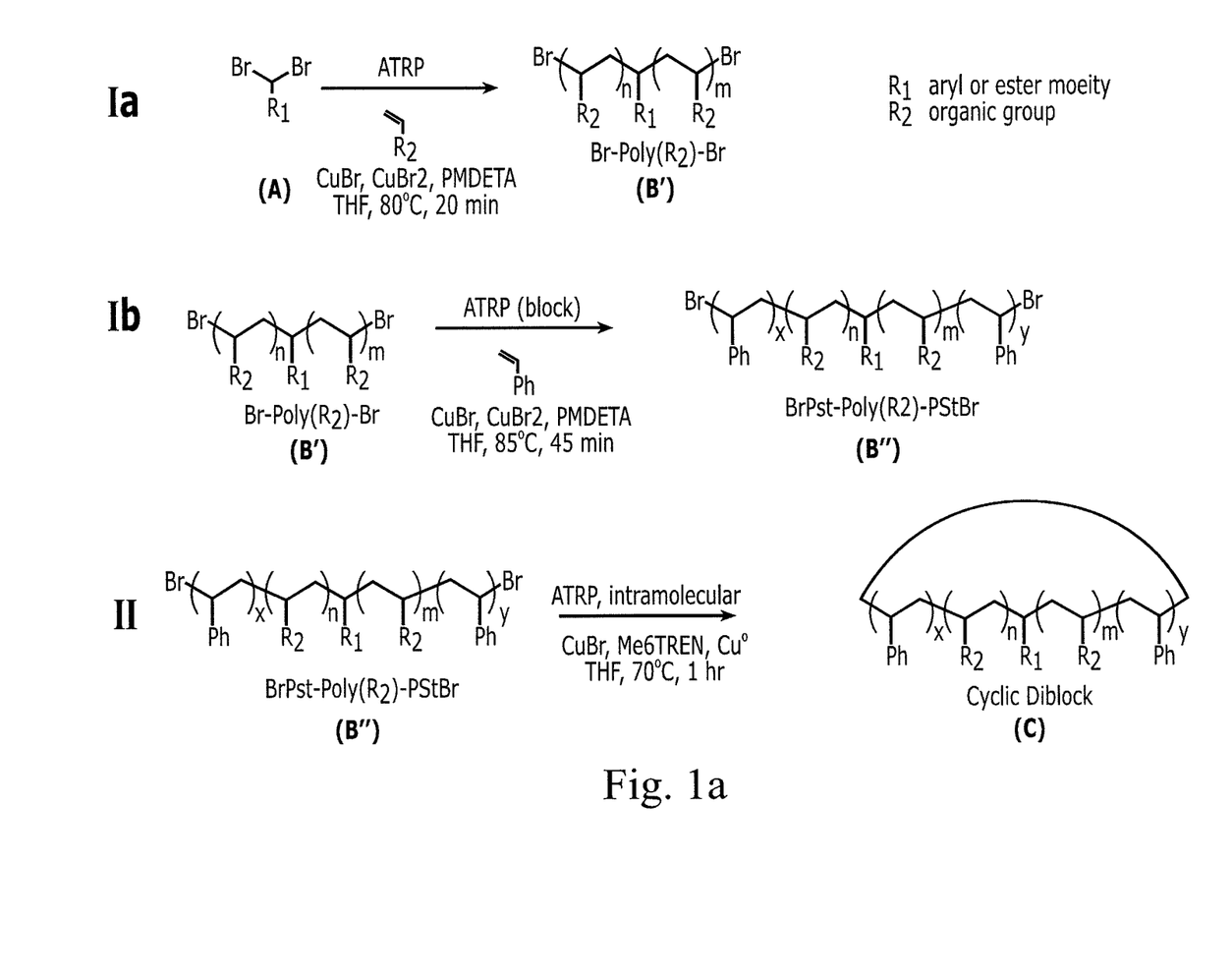
FIG. 1a illustrates an alternative to the mechanism of FIG. 1 using (Ia) ATRP to generate a dibrominated polymer which does not have phenylated end groups, (Ib) ATRP to block copolymerize the dibrominated polymer to produce a precursor having a brominated phenylated end groups suitable for ATRC, and (II) ATRC of the dibrominated polymer to form macrocyclic polymer.

In this embodiment, the precursor polymer (B') has the following structure:

(B')

wherein: m is an integer from 1-100; n is an integer from 1-100; and each instance of R2 is selected independently from substituted and non-substituted, alkyls, alkylenes, alkenyls, alkenylenes, alkynyls, alkoxys, aryls, aralkyls, and hydrocarbyls. In a more particular embodiment, R2 is selected from an aryl or acrylate. In an even more particular embodiment, R2 is an acrylate. In one embodiment, the acrylate is methyl methacrylate.

Because the terminal groups of the intermediate polymer B' are not phenylated as described above, the intermediate polymer is subjected to terminal block copolymerization to render it suitable for ATRC. Accordingly, in one embodiment, block polystyrene is added to the ends of polymer B' using ATRP as shown in Step Ib. The resulting precursor polymer B" has the following structure:

(B")

wherein: x is an integer from 1-100 and y is an integer from 1-100.

Steps Ia and Ib therefore allow the intermediate polymer B' to be independent of the ATRC reaction and thus does not require brominated, phenylated end groups. Accordingly, intermediate polymer B' can be produced based on the desired polymer properties without being limited by its end groups. The necessary end groups to facilitate ATRC are added subsequently in a block copolymerization reaction. Therefore, a variety of different monomer can be used in step Ia to produce a wide variety of intermediate polymers B' For example, suitable monomers include, for example, styrene, oxybenzylmethylenglycolanhydride, chloroprene, amides, vinyl chloride, ethylene, propylene, acrylonitrile, vinyl butyral, tetrafluoroethylene, methyl methacrylate, carbonate, siloxane, and phosphazene. The resulting intermediate polymer may be, for example, polystyrene, synthetic rubber, polyoxybenzylmethylenglycolanhydride, polychloroprene, polyamides, polystyrene, polyvinyl chloride, polyethylene, polypropylene (low and high density), polyacrylonitrile, polyvinyl butyral, polytetrafluoroethylene, poly(methyl methacrylate), polycarbonates, polysiloxane, and polyphosphazene.

Producing a dibrominated polymer of B or B' using ATRP is a known process and can be used with a variety of different monomers to produce a variety of different polymers without undue experimentation. Generally, the ATRP is conducted under extremely low steady state concentration of active radicals, allowing propagation of the polymer chain to proceed with suppressed radical-radical coupling. For example, in one embodiment, the monomer and initiator are added to a solution containing an ATRP catalyst such as a bromide compound (e.g., copper(I) bromide and or copper (II) dibromide). The ratio of copper bromide to monomer can vary, although suitable results are obtained with ratios of 10-50:1 (CuBr:M). The ratio of monomer to initiator may also vary, although ratios of about 1:10 to 1:100 provide suitable results. In one embodiment, the mixture is then deoxygenated using known means such as cycles of freeze-pump-thawing, although other techniques for deoxygenating the mixture may be used.

The polymerization is started by heating the solution to an appropriate temperature, for example, 80° C., and adding a ligand such as N,N,N',N',N-Pentamethyldiethylenetriamine (PMDETA). After polymerization, the substance may be purified which includes removing the metal ion from the metal salts if used and any other reagents.

As mentioned above, if the terminal groups of the polymer are not phenylated (or styrenic), a block polymerization process may be used to produce brominated, phenylated end groups. Again, such block copolymerization is known. To add phenylated end groups, in one embodiment, block polymerization involves adding styrene diluted in a known solvent such as tetrahydrofuran (THF) to the precursor B' and promoting polymerization by heating the mixture and adding a known ligand such as PMDETA, and again typical ATRP catalysts such as copper (I) bromide. The resulting block polymer may then be purified using known techniques.

In step (II), ATRC is performed to cyclize the polymer precursor B or B". Unlike the ATRP reaction, in ATRC, the equilibrium is purposely pushed toward the right to maximize the concentration of polymer radicals, thus increasing the rate of radical-radical coupling. Such ATRC reactions are known. The ATRC involves can occur by two different routes—the first being intermolecular cyclization, and the second being intramolecular cyclization. The intermolecular cyclization involves activating the chain ends by metal-catalyzed, homolytic C—Br cleavage to create carbon-based radicals that undergo radical-radical coupling reactions (ATRC). In one embodiment, this is performed by adding a solution of copper bromide (or other similar catalyst), a reducing agent, and a ligand to the polymer precursor. Suitable reducing agents include, for example, nanosize copper. The mixture is then deoxygenated by freeze-pump-thaw cycles, although other techniques may be used. The ATRC reaction is then initiated by heating the mixture to a suitable temperature (e.g., 50-90° C.) and introducing a suitable ligand such as Me6TREN. Note that this reaction will not produce cyclic polymers, but can be used to ensure that the end groups of the polymer are able to be efficiently coupled.

To favor intramolecular coupling, the same reaction is performed except the ATRC is carried out under dilute conditions. In one embodiment, this involves slowly adding a THF solution of the polymer precursor to a redox-active solution, such as copper bromide, and a metal ligand, and a ligand such as $Me_6TREN$. After a dilute solution of the polymer precursor is slowly added to the reaction mixture, the reaction mixture is stirred for an extended period, for example, 5 to 48 hrs. The contents of the reaction mixture may then be concentrated and purified using known techniques.

The present invention also comprises any novel polymer made using the method described above.

EXAMPLES

This invention is described further by virtue of the following non-limiting examples. It should be understood, that while this example focuses on the preparation of macrocyclic polystyrene and macrocylce poly(methyl methacrylate) polystyrene block copolymer, other macrocyclic polymers may be prepared using the ATRP and ATRC sequential reactions as disclosed in this application.

Example 1

Synthesis of α,ω-Dibrominated Polystrene (BrPStBr) Precursor

Figure 2:
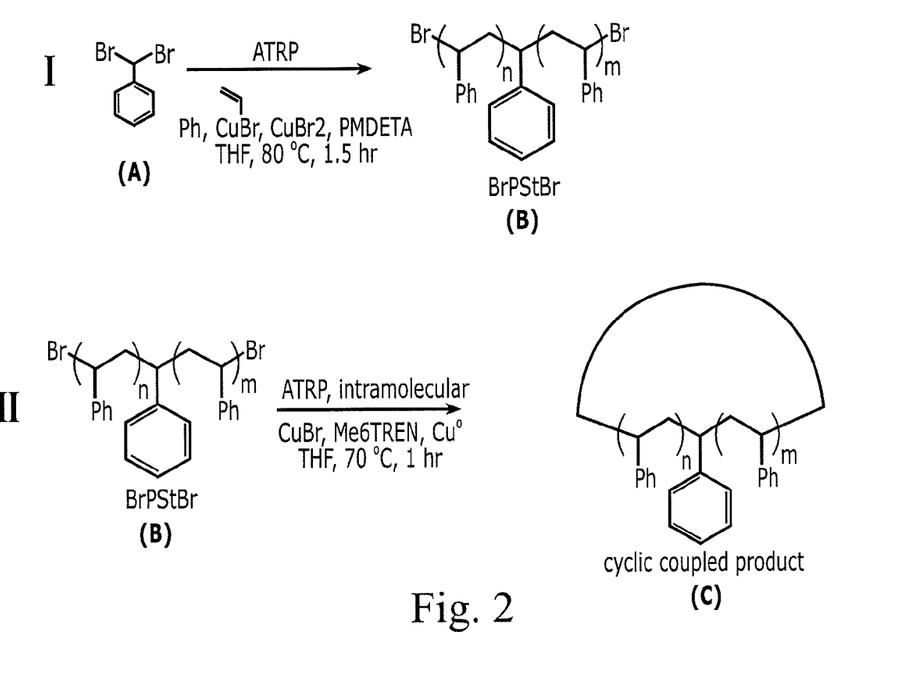
FIG. 2 illustrates specific mechanisms for using (I) ATRP of styrene using a bifunctional initiator to generate dibrominated polystyrene precursors (BrPStBr) and (II) intramolecular ATRC of the BrPStBr to form macrocyclic PSt.
Figure 3:
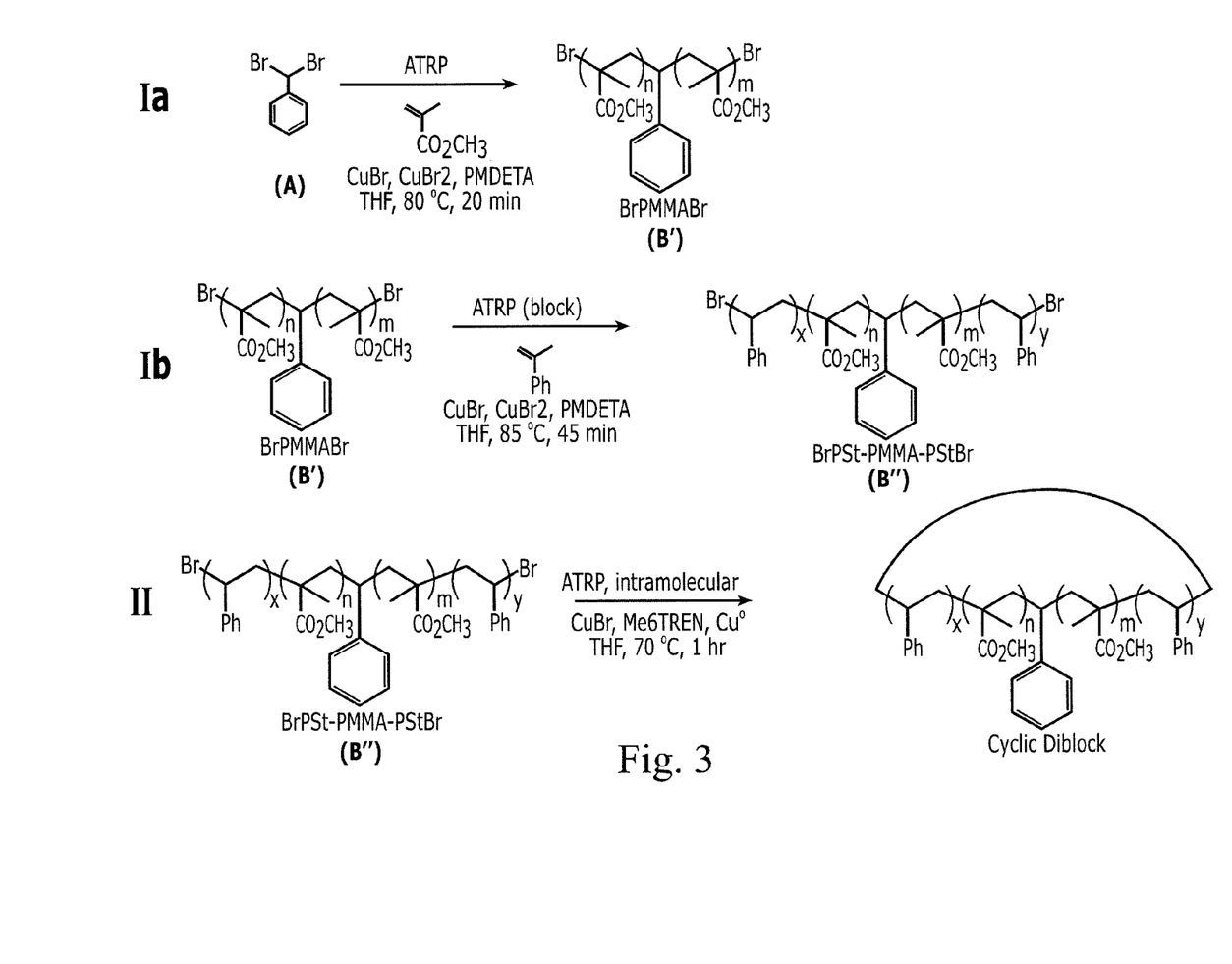
FIG. 3 illustrates specific mechanisms for using (Ia) ATRP of methyl methacrylate to produce poly(methyl methacrylate) (BrPMMABr), (Ib) ATRP to block copolymerize the BrPMMABr to produce dibrominated poly(methyl methacrylate) polystyrene block copolymer, and (II) intramolecular ATRC of the dibrominated poly(methyl methacrylate)

Referring to FIG. 2(A), BrPStBr is prepared using ATRP. ATRP and its "built-in" alkyl halide chain-end functionality was exploited to produce α,ω-dibrominated polystrene (BrPStBr) of controllable sizes and low polydispersity indices (PDI's). Specifically, to achieve [monomer]/[initiator]=25:1, CuBr (200 mg, 1.4 mmol) and $CuBr_2$ (156 mg, 0.7 mmol) were added to a flamed, 50 mL, 2-neck round bottom flask. The reaction flask was placed on a Schlenk line with a septum on the remaining neck. The flask was evacuated, after which styrene (2.0 mL, 17.5 mmol) and benzal bromide (94 µl, 0.7 mmol) were sequentially introduced into the reaction chamber via argon-flushed syringes. The reaction mixture was then subjected to three cycles of freeze-pump-thawing, after which the flask was sealed from the Schlenk line via a Teflon stopcock. The reaction vessel was then placed in an oil bath set at 70° C. and stirred for several minutes to allow the contents to reach the temperature of the bath, after which PMDETA (290 µl, 1.4 mmol) was added via an argon flushed syringe to commence the polymerization. Next, the reaction mixture was diluted with tetrahydrofuran (THF) and then purified by passing it through an alumina column to remove the copper. The ultra white powder was characterized by GPC and stored at −15° C.

Intermolecular Coupling of BrPStBr Precursor

To optimize cyclization, the dibrominated polystyrene is first subjected to intermolecular ATRC (i.e., "step" polymerization). Here, the chain ends were activated by metal-catalyzed, homolytic C—Br cleavage to create carbon-based radicals that undergo radical-radical coupling reactions (ATRC). More specifically, dibrominated polystyrene (BrPStBr with Mn=1330 gm/mol, PDI=1.16; 100 mg, 0.07 mmol), CuBr (50 mg, 0.35 mmol) and nanosize copper (22 mg, 0.35 mmol) were added to a 50 ml round bottom flask which was previously flamed, evacuated and cooled. After sealing with a rubber septum, 2 ml THF was introduced into the flask via argon-flushed syringe. Three freeze-pump-thaw cycles were performed and the flask was placed in an oil bath and stirred at 70° C. The reaction was initiated by introducing Me6TREN (94 µl, 0.035 mmol) via argon-flushed syringe. After 1 h, the flask was removed from the oil bath and the solution was diluted with THF. Coupled product was analyzed directly from the crude reaction mixture (Mn=6272; PDI=1.68), and the results are provided in Table 1 below.

TABLE 1

Intermolecular ATRC of BrPStBr: formation of "step" polymers

| Trial | Precursor[a] $M_n$ | PDI | ATRC product[b] $M_n$ | PDI | [BrPStBr]:[CuBr]:[L]:[$Cu^0$][c] |
|---|---|---|---|---|---|
| 1 | 1330 | 1.16 | 3250 | 2.01 | 1:5:5:0 |
| 2 | 1330 | 1.16 | 1460 | 1.62 | 1:10:10:0 |

TABLE 1-continued

Intermolecular ATRC of BrPStBr: formation of "step" polymers

| | Precursor[a] | | ATRC product[b] | | |
|---|---|---|---|---|---|
| Trial | $M_n$ | PDI | $M_n$ | PDI | [BrPStBr]:[CuBr]:[L]:[Cu⁰][c] |
| 3 | 1330 | 1.16 | 8125 | 1.68 | 1:5:5:5 |
| 4 | 1330 | 1.16 | 5860 | 1.56 | 1:10:10:5 |

[a]Precursor is α,ω-dibrominated PSt (BrPStBr), formed by ATRP using benzal bromide as the initiator. Precursors were purified by running through an alumina column prior to characterization and use in ATRC reactions. Apparent number average molecular weight ($M_n$), and polydispersity index (PDI) values were obtained by GPC based on PS standards.
[b]Coupling was performed at 70° C. for one hour in THF at [BrPStBr] ~350 mM. Coupled product was analyzed by GPC without any purification
[c]Initial molar ratios of components in ATRC reaction.

Figure 6:
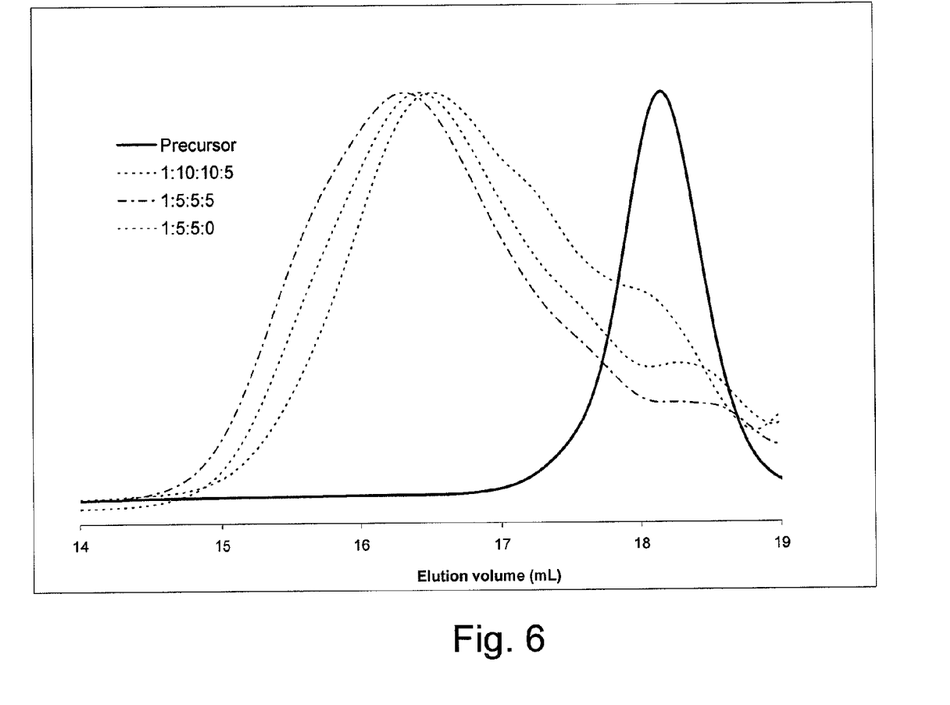
FIG. 6 shows GPC traces of ATRC coupled product and BrPStBr precursor when performed with a faster rate of dropwise addition of the BrPStBr.

FIG. 6 shows GPC traces of the products of intermolecular ATRC and of BrPStBr precursor at varying equivalents of C—Br:CuBr:Me₆TREN:Cu(0). As expected, when ATRC was performed at relatively high concentrations of both the BrPStBr precursor and varying molar excess amounts of copper bromide (CuBr), tris[2-(dimethylamino)ethyl]amine (Me₆TREN), and copper (0) in THF at 70° C. for one hour, higher molecular weight coupled, or "step", polymers were formed in high yields (BrPStBr precursor: $M_n$=1330, PDI=1.16; intermolecular ATRC "step" product": 8130, PDI=1.68). GPC traces of the ATRC intermolecular products demonstrated a quantitative shift to higher molecular weights when Me₆TREN was used as the ligand, consistent with both high amounts of bromine end groups on the precursor and efficient coupling in the intermolecular ATRC reaction. When pentamethyldiethlyeneamine (PMDETA) was used in analogous ATRC reactions, the coupling reaction was less efficient as evidenced by less dramatic shifts to higher values in the $M_n$ of the coupled product.

Intramolecular Cyclization of BrPStBr Precursor

The next ATRC step involves shifting the preference to intramolecular ATRC as shown in FIG. 2(B), and thus produce cyclic polymers. To this end, a 500 ml, 2-neck round bottom flask containing a 150 mL THF solution of CuBr (326 mg, 2.27 mmol), and Me₆TREN (607 μL, 2.27 mmol) was flushed with argon for 30 min. One neck was equipped with a septum, allowing argon to purge the flask, while the other upright neck was fitted with a condenser, addition funnel, and finally a drying tube. The addition funnel contained a 100 mL THF solution of the BrPStBr (Mn=2200 g/mol, 0.5 g, 0.227 mmol) which had separately been bubbled with argon for 10 min. Note that the contents of the cyclization reaction were not subjected to any cycles of freeze-pump-thaw, and the reaction contents were simply purged with argon. To the stirring, refluxing THF solution of the metal ligand, the solution of BrPStBr was slowly dripped over approximately 12 hrs (approximate rate=0.140 ml/mim). After the contents of the addition funnel had been added to the reaction mixture, the reaction mixture was stirred for an additional 9 hrs. The contents of the reaction flask were concentrated under reduced pressure, and the coupled polymer was analyzed directly without precipitation by GPC, the results of which are listed in Table 2 below. Percent cyclic product was estimated by peak areas of the RI traces of the coupled product.

TABLE 2

Intramolecular ATRC of BrPStBr: formation of cyclic polymers

| | Precursor[a] | | ATRC product[b] | | |
|---|---|---|---|---|---|
| Trial | $M_n$ | PDI | $M_n$ | PDI | % cyclic[c] |
| 1 | 2850 | 1.17 | 2580 | 1.22 | >90 |
| 2 | 1390 | 1.17 | 1180 | 1.26 | >90[d] |
| 3 | 2200 | 1.16 | 2991 | 1.87 | 40[e] |

[a]Precursor is α,ω-dibrominated PSt (BrPStBr), synthesized and purified in an identical manner as described in Table 1.
[b]Coupling was performed by dropwise addition of BrPStBr solution (2 mM) into a refluxing THF solution of [CuBr]:[L]:[Cu⁰] = 10:10:10 with [CuBr]I = 30 mM.
[c]Percentage of cyclic polymer in ATRC product, as estimated by areas under the RI traces on the GPC chromatograms.
[d]BrPStBr precursor was added drop wise over approximately 12 hours.
[e]BrPStBr precursor was added drop wise over approximately 6 hours.

Figure 7:
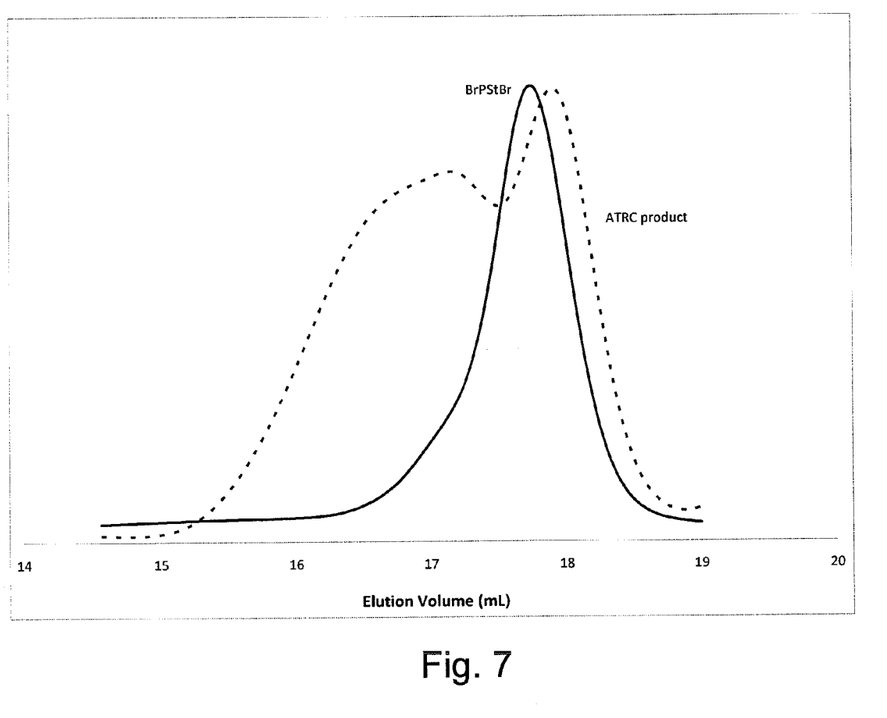
FIG. 7 shows GPC traces of ATRC coupled product and BrPStBr precursor when performed with a faster rate of dropwise addition of the BrPStBr.

As shown in Table 2, the amount of cyclic product was a consequence of the rate of addition of the BrPStBr precursor into the metal-ligand solution. Furthermore, as shown in FIG. 7, cyclic product was still formed with a faster rate of addition yet intermolecular ATRC became the dominant reaction pathway. Specifically, FIG. 7 shows GPC traces of ATRC coupled product and BrPStBr precursor when performed with a faster rate of drop-wise addition of the BrPStBr (Table 2, Trial 3).

Figure 4:
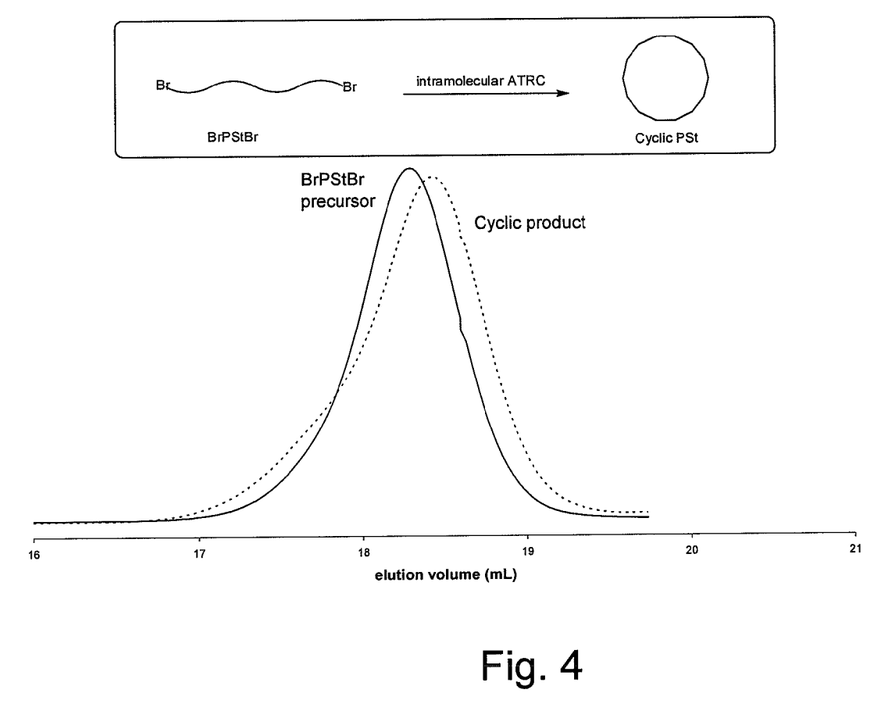
FIG. 4 shows GPC traces of the BrPStBr precursor and the subsequent cyclic product formed by intramolecular ATRC.

Comparison of the gel permeation chromatography (GPC) traces of the initial BrPStBr precursor compared to the coupled product show the trademark shift to a lower apparent molecular weight value in the product, indicative of the formation of cyclic polymer as shown in FIG. 4. Specifically FIG. 4 shows GPC traces of the BrPStBr precursor (solid line; $M_n$=1395, PDI=1.17) and the subsequent cyclic product formed by intramolecular ATRC (dotted line; $M_n$=1180, PDI=1.26). The amount of cyclic polymer formed in the reaction was estimated to be >90% based on the relative areas of the GPC-RI traces attributed to cyclic material compared to the total area of polymer formed in the ATRC reaction.

Figure 5:
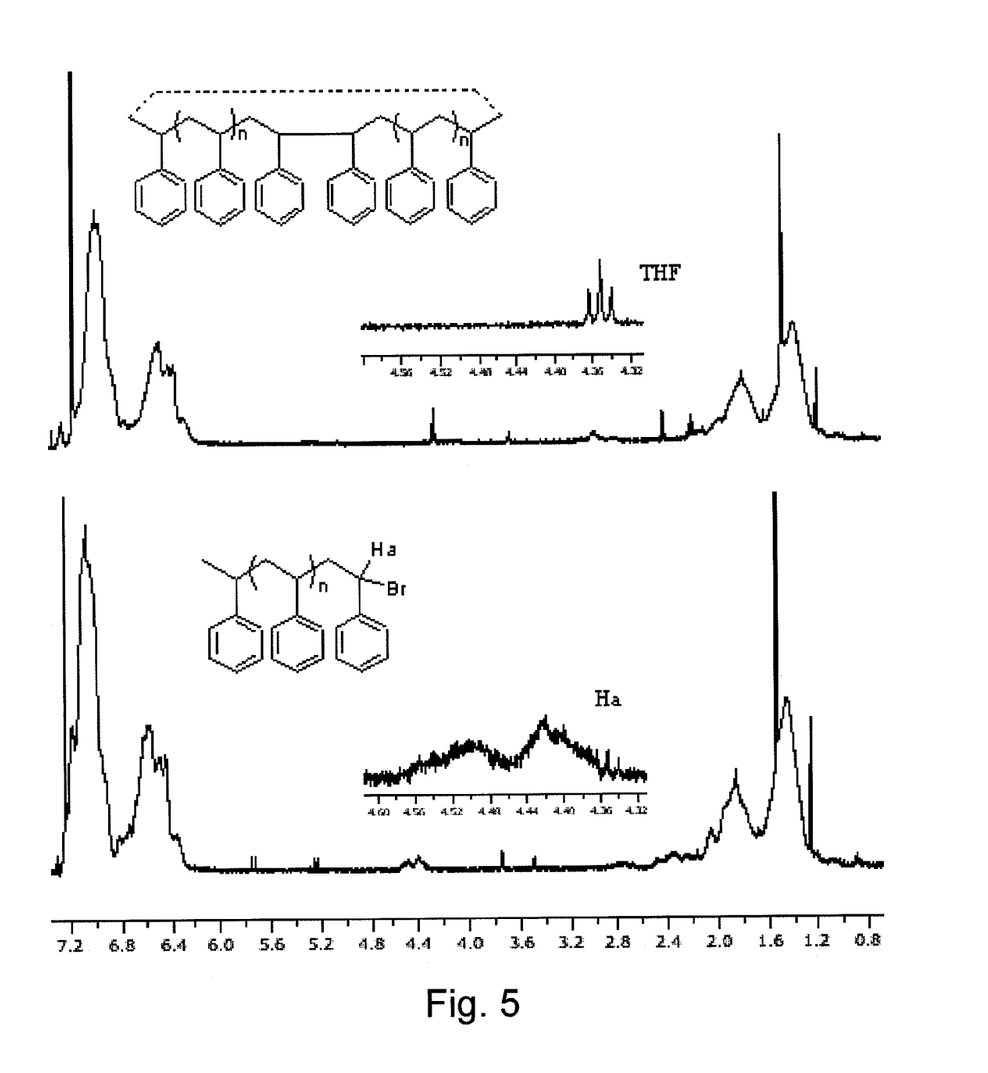
FIG. 5 shows NMR spectra of GPC traces of the products of intermolecular ATRC and of BrPStBr precursor at varying equivalents of C—Br:CuBr:Me$_6$TREN:Cu(0).

To add support to the intramolecular ATRC mechanism (FIG. 2, B) that is attributed to the formation of the macrocycles, ¹H NMR of the BrPStBr was compared to that of the ATRC product. The radical-radical coupling cyclization reaction was confirmed by ¹H NMR, with the resonance due to the C(H)Br methine termini on the BrPStBr precursor absent on the NMR spectrum of the cyclic product. As expected, the C(H)—Br terminal methine protons were clearly evident in the precursor, yet completely absent in the coupled product as shown in FIG. 5. Specifically, FIG. 5 shows a 600 MHz ¹H NMR spectra of BrPStBr precursor (bottom, only one chain end shown in illustration) and the corresponding cyclic PSt (top) generated by intramolecular ATRC. Inset shows the region of the terminal methine resonances.

Example 2

Synthesis of α,ω-Dibrominated Poly(Methyl Methacrylate) (BrPMMABr) Precursor

For [Monomer]/[Initiator]=100:1, CuBr (109 mg, 7.5 mmol), CuBr₂ (169 mg, 7.5 mmol) and a stir bar were placed in a flamed 50 mL, 2 necked flask that was placed on a Schlenk line. The remaining neck was sealed with a septa and the flask was subsequently evacuated. Benzal bromide (60 μL, 0.37 mmol) and MMA (4 mL, 37.7 mmol) were then added via argon flushed syringes and the solution was subjected to three freeze-pump-thawing cycles. The vessel was then sealed from the Schlenk line via a Teflon stopcock and allowed to reach 80° C. while stirring in an oil bath. The polymerization was initiated with the introduction of PMDETA (78 μL, 0.37 mmol) via an argon flushed syringe. After 20 min, the flask was cooled to 0° C., exposed to the atmosphere and diluted with THF to terminate the polymerization. The solution was passed through an alumina column to remove the copper and subsequently precipitated in cold methanol. GPC analysis was carried out on the resulting white powder ($M_n$=1470; PDI=1.21; Conversion=23.3%).

Synthesis of α,ω-Dibrominated Poly(Methyl Methacrylate) Polystyrene Block Copolymers.

Dibrominated poly(methyl methacrylate) (BrPMMABr, $M_n$=1470, PDI=1.21, 200 mg, 0.136 mmol), CuBr (39 mg, 0.27 mmol) and CuBr$_2$ (61 mg, 0.27 mmol) were placed in a 50 mL 2-neck round bottom that had previously been flamed and evacuated. The round bottom was placed on a Schlenk line, sealed with a septum and evacuated. Styrene (2 mL, 17.5 mmol) and THF (2 mL) were introduced sequentially via argon flushed syringes and three freeze/pump/thaw cycles were performed, after which the flask was seal from the Schlenk line with a Teflon stopcock. The flask was placed in an 85° C. oil bath for several minutes, until the temperature had equilibrated, at which point an argon flushed syringe was used to add PMDETA (28.5 μL, 0.136 mmol). After 45 min, the polymerization was terminated by cooling to 0° C., exposure to atmosphere and dilution with THF. The copper was removed from the solution with an alumina column, and the resulting polymer was precipitated in cold methanol three times to remove residual styrene. The ultra white powder was characterized via GPC. ($M_n$=2550; PDI=1.16; conversion=5.3%).

Cyclization of α,ω-Dibrominated Block Copolymers
ATRC was performed on the block copolymer in the same manner it was BrPStBr described above.

What is claimed is:

1. A method for producing a macrocyclic polymer comprising:
    (a) polymerizing a monomer using a dibrominated initiator having either an aromatic or ester moiety via atom transfer radical polymerization (ATRP) to form a polymer precursor having brominated, phenylated end groups; and
    (b) cyclizing said polymer precursor using intramolecular atom transfer radical coupling (ATRC) by activating said brominated, phenylated end groups to form said macrocyclic polymer.

2. The method of claim 1, wherein step (a) comprises:
    (i) polymerizing said monomer to form an intermediate polymer with brominated end groups; and
    (ii) block polymerizing said intermediate polymer to add terminal block polymers having phenylated end groups to form said polymer precursor.

3. The method of claim 1, wherein said initiator has the following structure:

wherein R1 is an aryl group or ester group.

4. The method of claim 3, wherein said aryl group is selected from phenyl, napthyl, flourenyl, anthracenyl groups.

5. The method of claim 4, wherein said aryl group is phenyl.

6. The method of claim 5, wherein said initiator is benzal bromide.

7. The method of claim 3, wherein said ester group comprises: RCO$_2$R', wherein R and R' are selected independently form substituted and non-substituted alkyls, alkylenes, alkenyls, alkenylenes, alkynyls, alkoxys, aryls, aralkyls, and hydrocarbyls.

8. The method of claim 7, wherein R and R' are independently selected from substituted and non-substituted methyls, ethyls, propryls, and butyls.

9. The method of claim 8, wherein said initiator is ethylene bis(2-bromoisobutyrate).

10. The method of claim 3, wherein said precursor polymer has the following structure:

wherein:
    m is an integer from 1-100;
    n is an integer from 1-100; and
    R2 is an aryl.

11. The method of claim 10, wherein R2 is phenyl.

12. The method of claim 3, wherein said precursor polymer has the following structure:

Wherein:
    m is an integer from 1-100;
    n is an integer from 1-100;
    x is an integer from 1-100;
    y is an integer from 1-100; and
    each instance of R2 is selected independently from substituted and non-substituted, alkyls, alkylenes, alkenyls, alkenylenes, alkynyls, alkoxys, aryls, aralkyls, and hydrocarbyls.

13. The method of claim 12, wherein each instance of R2 is selected independently from substituted and non-substituted aryls and acrylates.

14. The method of claim 13, wherein said R2 is an acrylate.

15. The method of claim 14, wherein R2 is methacrylate.

16. The method of claim 1, wherein said monomer is at least one of the following monomers: styrene, oxybenzylmethylenglycolanhydride, chloroprene, amides, vinyl chloride, ethylene, propylene, acrylonitrile, vinyl butyral, tetrafluoroethylene, methyl methacrylate, carbonate, siloxane, and phosphazene.

17. The method of claim 16, wherein said precursor polymer has brominated, phenylated end groups and comprises at least one of: polystyrene, synthetic rubber, polyoxybenzylmethylenglycolanhydride, polychloroprene, polyamides, polystyrene, polyvinyl chloride, polyethylene, polypropylene (low and high density), polyacrylonitrile, polyvinyl butyral, polytetrafluoroethylene, poly(methyl methacrylate), polycarbonates, polysiloxane, and polyphosphazene.

18. The method of claim 1, wherein said ATRC comprises a step in which said end groups are radicalized by cleaving a moiety from therefrom.

19. The method of claim 18, wherein said step comprises a metal-catalyzed, hemolytic cleavage.

20. The method of claim 1, wherein said macrocyclic polymer is cyclic polystyrene.

21. The method of claim 1, wherein said precursor prepared from step (a) is not modified before it is cyclized in step (b).

\* \* \* \* \*